(12) United States Patent
Goekjian et al.

(10) Patent No.: US 10,585,844 B1
(45) Date of Patent: Mar. 10, 2020

(54) RELIABLE ASYNCHRONOUS BASEBAND PROTOCOL WITH CLOCK AND DATA RECOVERY BY CORRELATION

(71) Applicant: BAE Systems Information and Electronic Systems Integration Inc., Nashua, NH (US)

(72) Inventors: Kenneth S. Goekjian, Candia, NH (US); Dale C. Earl, Hudson, NH (US); Christopher A. Metildi, Pelham, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 16/116,224

(22) Filed: Aug. 29, 2018

(51) Int. Cl.
*G06F 13/42* (2006.01)
(52) U.S. Cl.
CPC ............... *G06F 13/4291* (2013.01)
(58) Field of Classification Search
CPC .... H03M 13/05; H03M 13/11; H03M 13/255; H03M 13/3972; H03M 13/45; H03M 13/451; G06F 13/4291
See application file for complete search history.

(56) References Cited

U.S. PATENT DOCUMENTS 7,415,079 B2 * 8/2008 Cameron ........... H03M 13/1102
375/340
8,046,657 B2 * 10/2011 Johannesson ......... H03M 13/05
714/752

OTHER PUBLICATIONS

International Search Report, PCT/US2019/047178, 7 pages, dated Oct. 18, 2019.

* cited by examiner

*Primary Examiner* — Idriss N Alrobaye
*Assistant Examiner* — Richard B Franklin
(74) *Attorney, Agent, or Firm* — Sand, Sebolt & Wernow LPA; Scott J. Asmus (57) ABSTRACT

A more robust universal asynchronous receiver-transmitter (UART) protocol utilizing a pattern matching methodology to evaluate and decode a serial data stream in noisy environments is provided. The UART protocol is may further allow for adjustment of the expected edge of a data bit within the serial data stream to reduce and/or eliminate drift in the data stream.

18 Claims, 5 Drawing Sheets

RELIABLE ASYNCHRONOUS BASEBAND PROTOCOL WITH CLOCK AND DATA RECOVERY BY CORRELATION

STATEMENT OF GOVERNMENT INTEREST

This invention was made with government support under Contract No. FA8634-17-C-2650/1329089 awarded by the U.S. Air Force. The government has certain rights in the invention.

BACKGROUND

Technical Field

The present disclosure relates to a serial data communications protocol. More particularly, in one example, the present disclosure relates to a universal asynchronous receiver-transmitter serial communications protocol. Specifically, in another example, the present disclosure relates to a universal asynchronous receiver-transmitter serial communications protocol utilizing a pattern matching process to more reliably detect a data stream in a noisy environment.

Background Information

Serial communication, particularly as it pertains to telecommunications and/or data transmission, involves sending data between two places a single bit at a time. Typically, serial communications utilize one of two main standards to transmit and receive data across networks, namely synchronous and asynchronous serial communications protocols.

Synchronous serial communications involve sending a continuous stream of data at a consistent rate, with no required stop bits within the data itself. Typically, synchronous protocols have a clock existing at the data source that is transmitted with the data. Over distance, the transmitting data and clock can drift apart, causing errors in the data. Utilizing these protocols with bidirectional communications can further cause the data and clock to move out of sync. Thus, the data timing has to account for the drift, which can put a tremendous slowdown on read times as the system attempts to meet the timing requirements.

Asynchronous serial communication protocols, commonly referred to as a universal asynchronous receiver-transmitter, or UART protocols, utilize a data stream with included start and stop signals, known as start bits and stop bits, that indicate to the receiver-transmitter that data is incoming or ending, respectively. The use of start and stop bits can allow the system to reset the timing between data transmissions. A typical UART protocol can detect the start bit and uses the start bit to set sample points based on the rising edge of that start bit. Once detected, the sample timing tends to be set with a first sample point set at an offset of one-half of a bit time, with subsequent sample points set at intervals of one bit time thereafter. In theory, this places each sample time at the predicted middle of the bit window where the UART determines if the serial data includes a "logic high" (i.e. a binary '1') or a "logic low" (i.e. binary '0') at that particular sample point. Current UART protocols therefore require oversampling which can result in an oversampling multiplier that can continuously rise as the data stream increases in length which in turn results in drift. This drift can throw off the sample timing and may ultimately cause errors in the data being received, particularly in longer serial streams. If too many errors result, the entire data stream may be unreliable.

Additionally, using set sampling points based on the rising edge of the start bit, as current UART protocols do, are susceptible to noise. Specifically, if a noise glitch gives a false start bit, the sample points may be misaligned and the entire incoming data stream is unusable and unreliable. Similarly, if a noise glitch happens to coincide with a sampling point, a data value may be misapplied, resulting in an error in the data, which, again, if too many errors are present, the entire data stream may be unreliable.

SUMMARY

The present disclosure addresses these and other issues by providing a more robust and reliable UART protocol utilizing a pattern matching process to compare each set of two bits within a serial data stream, thus reducing and/or eliminating data errors resulting from noise glitches.

In one aspect, the present disclosure may provide a method comprising: detecting a start bit of a serial data stream having a plurality of data bits; comparing a two-bit pair of data bits in the plurality of data bits to a first comparator; determining a first match level between the two-bit pair of data bits in the plurality of data bits and the first comparator; comparing the two-bit pair of data bits in the plurality of data bits to a second comparator; determining a second match level between the two-bit pair of data bits in the plurality of data bits and the second comparator; comparing the first match level to the second match level; and, assigning a binary value to each data bit of the two-bit pair of data bits in the plurality of data bits corresponding to the larger of the first and second match values. This exemplary embodiment or another exemplary embodiment may further provide comparing every two-bit pair of data bits in the plurality of data bits to the first comparator; determining a first match level between every two-bit pair of data bits in the plurality of data bits and the first comparator; comparing every two-bit pair of data bits in the plurality of data bits to the second comparator; determining a second match level between every two-bit pair of data bits in the plurality of data bits and the second comparator; comparing the first match level to the second match level for every two-bit pair of data bits; and, assigning a binary value to each data bit of every two-bit pair of data bits in the plurality of data bits corresponding to the larger of the first and second match values. This exemplary embodiment or another exemplary embodiment may further provide detecting a stop bit within the serial data stream; and, stopping the comparisons of the two-bit pairs and assigning of binary values thereto in response to detecting the stop bit. This exemplary embodiment or another exemplary embodiment may further provide wherein the first comparator is a two-bit binary pattern of '01' where 0 represents the first bit in the two-bit pair and 1 represents the second bit in the two-bit pair. This exemplary embodiment or another exemplary embodiment may further provide wherein the second comparator is a two-bit binary pattern of '11' where the first 1 represents the first bit in the two-bit pair and the second 1 represents the second bit in the two-bit pair. This exemplary embodiment or another exemplary embodiment may further provide wherein the first match level represents a percentage match between the two-bit pair and the first comparator and the second match level represents a percentage match between the two-bit pair and the second comparator. This exemplary embodiment or another exemplary embodiment may further provide assigning a binary value to each data bit of the two-bit pair of the plurality of data bits corresponding to the larger of the first and second match values only if the larger of the first and second match values meets or exceeds a match value threshold. This exemplary embodiment or another exemplary embodiment may further provide wherein the match value threshold is configurable. This exemplary embodiment or another exemplary embodiment may further provide detecting the edge of each data bit in the two-bit pair; comparing a location of the detected edge of each data bit in the two-bit pair to an expected edge of each data bit in the two-bit pair; and, determining if the location of the detected edge aligns with the expected edge. This exemplary embodiment or another exemplary embodiment may further provide adjusting the expected edge forward one clock if the detected edge of a data bit is later than the expected edge of a data bit or backwards one clock if the detected edge of a data bit is earlier than the expected edge of a data bit.

In another aspect, the present disclosure may provide a system comprising: a processor capable of executing logical functions; and at least one non-transitory computer readable storage medium having instructions encoded thereon that, when executed by the processor, implements operations to decode a serial data stream, the instructions including: detect a start bit within a serial data stream having a plurality of data bits; compare a two-bit pair of data bits in the plurality of data bits to a first comparator; determine a first match level between the two-bit pair of data bits in the plurality of data bits and the first comparator; compare the two-bit pair of data bits in the plurality of data bits to a second comparator; determine a second match level between the two-bit pair of data bits in the plurality of data bits and the second comparator; compare the first match level to the second match level; and, assign a binary value to each data bit of the two-bit pair of data bits in the plurality of data bits corresponding to the larger of the first and second match values. This exemplary embodiment or another exemplary embodiment may further provide wherein the processor is a field-programmable gate array further comprising: at least one programmable HDL encoded logic block, the at least one programmable HDL encoded logic block encoded with the instructions to implement the operations to decode the serial data stream. This exemplary embodiment or another exemplary embodiment may further provide wherein the processor is an application specific integrated circuit further comprising: at least one programmable HDL encoded logic block, the at least one programmable HDL encoded logic block encoded with the instructions to implement the operations to decode the serial data stream. This exemplary embodiment or another exemplary embodiment may further provide wherein the first comparator is a two-bit binary pattern of '01' where 0 represents the first bit in the two-bit pair and 1 represents the second bit in the two-bit pair. This exemplary embodiment or another exemplary embodiment may further provide wherein the second comparator is a two-bit binary pattern of '11' where the first 1 represents the first bit in the two-bit pair and the second 1 represents the second bit in the two-bit pair. This exemplary embodiment or another exemplary embodiment may further provide wherein the first match level represents a percentage match between the detected two-bit pair and the first comparator and the second match level represents a percentage match between the detected two-bit pair and the second comparator. This exemplary embodiment or another exemplary embodiment may further provide wherein the instructions further include: assign a binary value to each data bit of each two-bit pair of the plurality of data bits corresponding to the larger of the first and second match values only if the larger of the first and second match values meets or exceeds a match value threshold. This exemplary embodiment or another exemplary embodiment may further provide wherein the match value threshold is configurable. This exemplary embodiment or another exemplary embodiment may further provide wherein the instructions further include: detect the edge of each data bit in the two-bit pair of data bits; compare a location of the detected edge of each data bit in the two-bit pair of data bits to an expected edge of each data bit; determine if the location of the detected edge aligns with the expected edge; and adjust the expected edge forward one clock if the detected edge of a data bit is later than the expected edge of a data bit or backwards one clock if the detected edge of a data bit is earlier than the expected edge of a data bit. This exemplary embodiment or another exemplary embodiment may further provide wherein the instructions further include: detect a stop bit within the serial data stream; and, stop the comparisons of the two-bit pairs and assigning of binary values thereto in response to the detection of the stop bit.

BRIEF DESCRIPTION OF THE SEVERAL VIEWS OF THE DRAWINGS

Sample embodiments of the present disclosure are set forth in the following description, is shown in the drawings and is particularly and distinctly pointed out and set forth in the appended claims.

Similar numbers refer to similar parts throughout the drawings.

DETAILED DESCRIPTION

Figure 1:
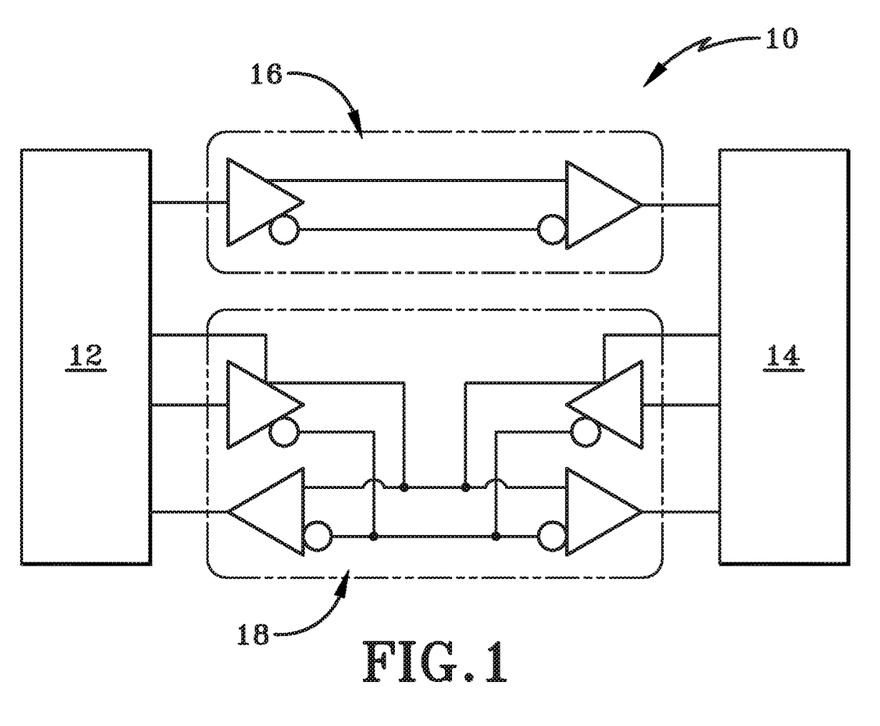
FIG. 1 is schematic view of a representative communications bus that may utilize the present protocol.

With reference to FIG. 1, a general communications bus (RFB) interface is shown and generally indicated at 10. RFB interface 10 can include a primary logic 12, commonly known as and referred to herein as master 12, one or more secondary logics 14, commonly known as and referred to herein slaves 14, a unidirectional control bus (RFCB) 16, and a bidirectional data bus (RFDB) 18.

According to one aspect, RFB interface 10 can be a standard RFB interface wherein master 12 can write to and/or read from the one or more slaves 14. According to another aspect, RFB interface 10 can include more than one master 12, with a first master 12 controlling a first slave 14 associated with the RFCB 16 and a second master 12 controlling a second slave 14 associated with the RFDB 18.

RFCB 16 can be a unidirectional interface operable to write control information from the master 12 to the one or more slaves 14 while RFDB 18 may be a bidirectional interface used to read and write between master 12 and the one or more slaves 14. According to one aspect, the RFCB 16 interface and RFDB 18 interface may use the same communications protocol as further described herein.

Figure 2:
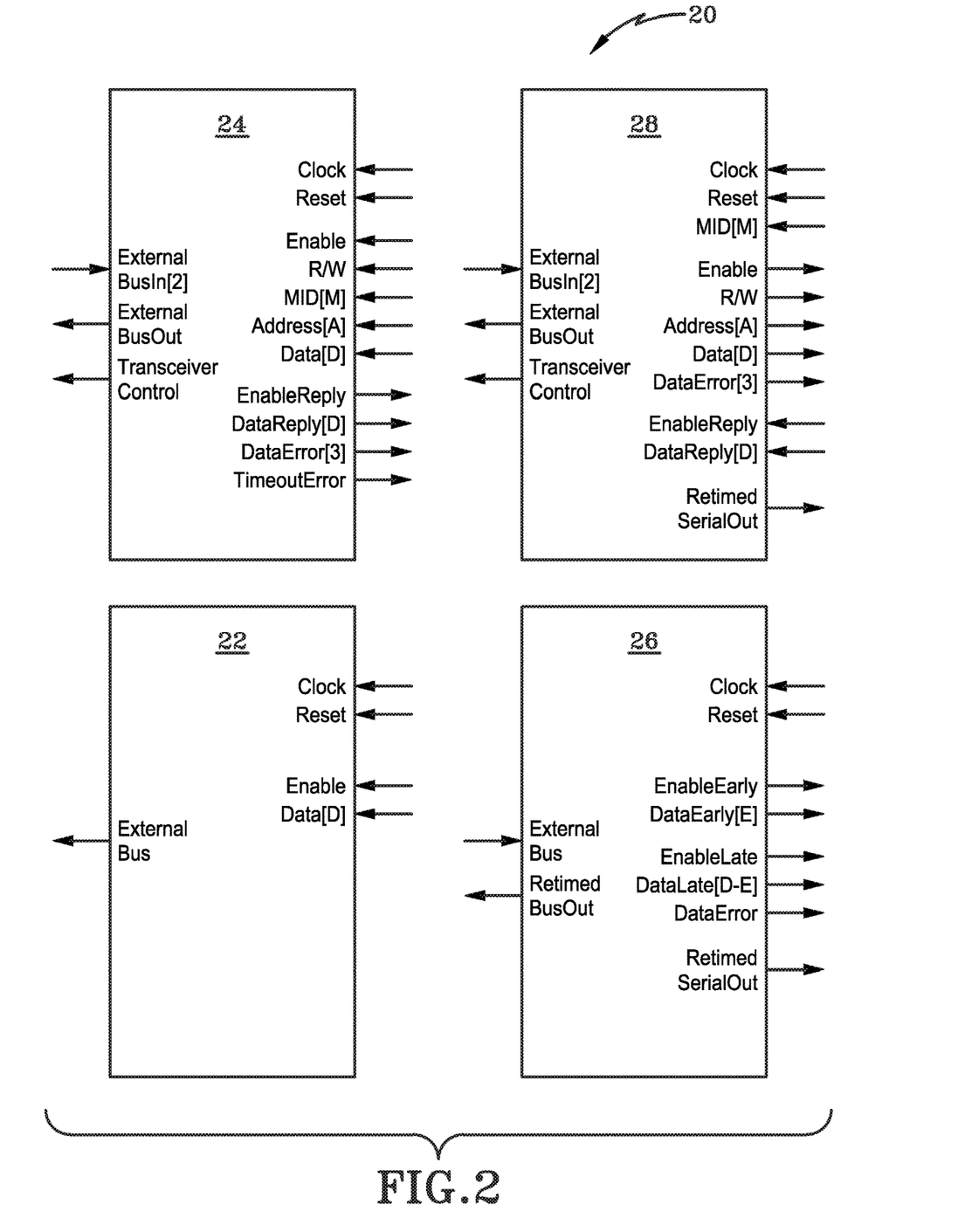
FIG. 2 is a logic block diagram of a set of logic blocks of the present disclosure.

With reference to FIG. 2, a representative logic block 20 diagram is shown and may represent firmware blocks used in the implementation of the RFB interface 10. Logic blocks 20 may include an RFCB master 22 and an RFDB master 24 corresponding to an RFCB slave 26 and RFDB slave 28, respectively.

RFCB master 22 and RFCB slave 26 can have a unidirectional interface wherein the RFCB master may write to the RFCB slave while the RFDB master 24 and RFDB slave 28 can be bidirectional such that RFDB master 24 can both write to and read from RFDB slave 28.

According to one aspect, the logic block 20 can be a field-programmable gate array (FPGA) having one or more programmable hardware description language (HDL) encoded logics or logic controllers operable to instruct a processor or processing unit to implement operations to decode a serial data stream, as discussed below. According to one non-limiting example, the FPGA may include embedded firmware that resides on memory, such as read only memory (ROM), and executes certain instructions.

According to another aspect, the logic block 20 can be or include a microchip or microprocessor attached to or in communication with a larger UART module. According to another aspect, the logic block 20 can be a UART module and may include other components and connections common thereto. It will be understood that the logic block 20 can be modified or integrated into a larger system according to the desired implementation without deviation from the scope herein.

According to another aspect, logic block 20 may form a portion of, may be, or may further include an application specific integrated circuit (ASIC) that has one or more HDL encoded logics or logic controllers operable to instruct a processor or processing unit to implement operations to decode a serial data stream, as discussed below.

According to another aspect, logic block 20 can be separated into two or more blocks or chips and integrated into a circuit board or UART module. According to this aspect, RFDB master 24 and RFDB slave 28 can be separate from RFCB master 22 and RFCB slave 26, but in communication therewith.

Logic block 20 may further include a transceiver 29 operable to send and receive data from locations remote from Logic block 20. According to one aspect, transceiver 29 can be integrated into RFDB master 24 and/or RFDB slave 28, as shown in FIG. 2.

With reference to FIGS. 1 and 2, one advantage of the universal asynchronous receiver-transmitter (UART) protocol of the present disclosure (generally indicated in the figures as reference 30) is that it can be implemented into existing field-programmable gate array (FPGA) interfaces. Therefore, it will be understood that the RFB interface 10 and Logic block 20 depicted herein can be adapted or modified for the particular implementation parameters as chosen by a person of skill in the art. It will be further understood that standard FPGA or known UART interfaces can be adapted for use with UART protocol 30.

Figure 3:
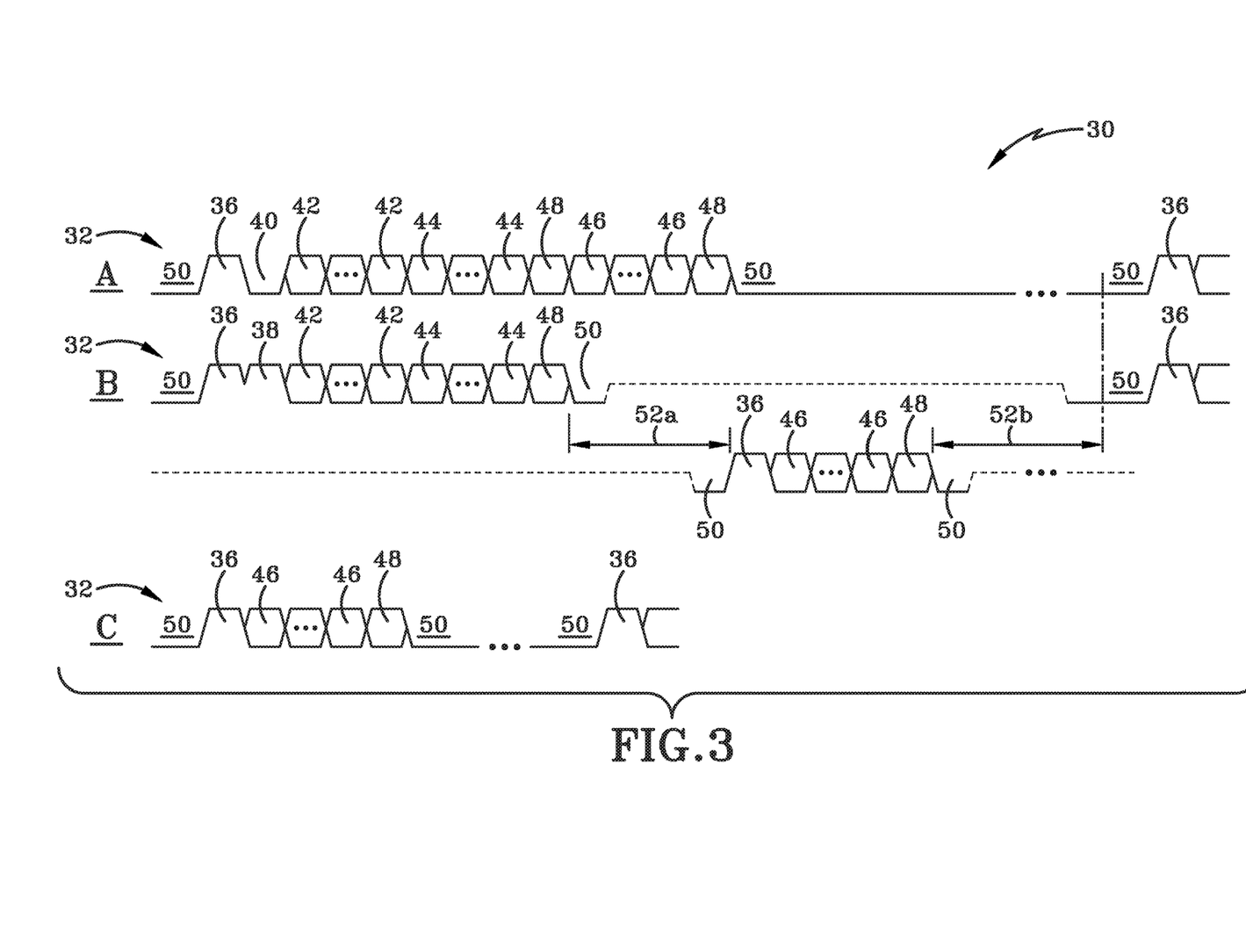
FIG. 3 is a data stream diagram of the present disclosure in a bidirectional configuration.

With reference to FIG. 3, the present UART protocol 30 may utilize one or more data streams 32 representing data being sent to, from, or both to and from Logic block 20. This data stream 32 can be a serial stream (i.e. one bit after another in serial chain) that may represent any data transmission, including but not limited to audio data, communications data, or the like. According to one aspect, data stream 32 may be encoded as a series of binary digits, with each data bit 34 within a data stream 32 representing a single binary digit, i.e. a '0' or a '1'.

Accordingly, as depicted in FIG. 3, a representative data stream 32 may have a plurality of data bits 34 and may include a start bit 36, one or more read bits 38, one or more write bits 40, one or more mid bits 42, one or more address bits 44, one or more general data bits 46, and one or more parity bits 48. As further shown in FIG. 3, when a line (e.g. lines A, B, or C) is not being used to transmit or receive a data stream 32, the line may enter an idle state, indicated at 50. Turnarounds 52 may occur in bi-directional lines (e.g. lines A and B) to allow for data to transmit in both directions, as discussed below.

According to one embodiment, UART protocol 30 may allow the MID 42, address 44, general data bits 46, parity bits 48, and turnarounds 52 to be parameterized and therefore configurable within UART protocol 30. According to one aspect, default widths can be set with a MID bit 42 width equal to 5, and address bit 44 width equal to 26, a general data bit 46 width equal to 16, and parity bit 48 width equal to 7. Similar default values can be established and/or chosen by a person of skill according to the desired implementation for these or other parameters within UART protocol 30. According to one aspect, turnaround 52 windows and transfer separation lengths may also be configurable within UART protocol 30.

As depicted in FIG. 3, when a stream of data is being transmitted through a system, the data stream 32 is shown in solid lines to indicate that the physical cable is in use. Dotted lines, then, represent a condition wherein the line is being used for one way communications and a second communication is pending or holding until a turnaround 52 allows for a change in data transmission direction. Accordingly, as depicted in FIG. 3, the top line 'A' represents a data stream being transmitted in a first direction, such as an RFDB master 24 writing to the RFDB slave 28, where line 'B' then represents a two-way data transmission using the same cable, wherein the top portion shows data being sent in a first direction and the bottom portion shows data being sent in a second direction. A first turnaround 52 (shown in FIG. 3 as 52a) represents the break in data transmission wherein line 'B' can change to the second data transmission and a second turnaround 52 (shown as 52b), can indicate the point at which the direction can reverse back to the original condition. Thus, line 'B' shows a single line being utilized for data transmission in a bidirectional pattern such as the RFDB master 24 reading from the RFDB slave 28. According to this aspect, lines 'A' and 'B' utilize a single cable or connection. Line 'C' then illustrates a cable used solely for unidirectional data transmission, such as the RFCB master 22 writing to the RFCB slave 26.

UART protocol 30 is designed in a half-duplex system utilizing cable lines for bidirectional communications. It is known that utilizing concurrent bidirectional communications within a half-duplex system can cause overheating and physical deterioration of the system. It will be therefore understood that the UART protocol 30 may use turnarounds 52 to avoid sending data in both directions at the same time, similar to a standard asynchronous serial protocol.

Having thus described the implementation of the present UART protocol, the operation and advantages thereof will now be discussed.

A serial data stream, such as data stream 32, generally entails a series of bits with each bit representing a single binary digit, specifically a 0 or a 1. In a classic or traditional UART, a receiver is monitoring a data cable or data connection for the appearance of an incoming serial beta stream. Typically, these receivers operate in either a low power mode, monitoring a string of consecutive 0s, or in a high power mode, monitoring a string of consecutive 1s. Both modes, and the associated string of consecutive digits, typically represent no data being transmitted.

As used further herein, for the purposes of clarity, UART protocol 30 can operate in a low power mode during idle 50 periods where no data is being sent. It will be therefore understood that the examples and configurations discussed further herein assume the low power idle 50 state, and a person of skill could readily adapt UART protocol 30 for use with a high power idle 50 state.

Figure 4:
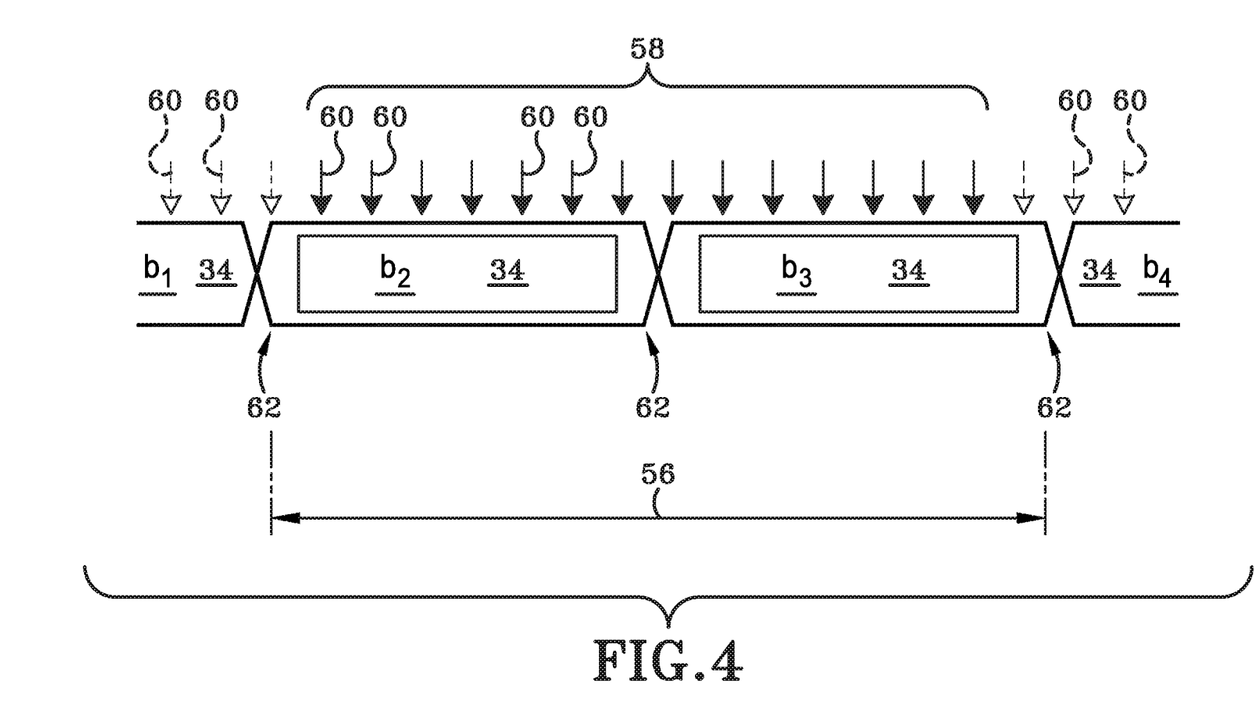
FIG. 4 is an enhanced view of a two-bit pair of a serial data stream of the present disclosure.

Accordingly, with reference to FIG. 4, when a data stream 32 is then sent to a receiver, such as transceiver 29, the receiver will detect a start bit 36 of the data stream. Typically, the start bit 36 is detected by what is known as its "rising edge" 54 which represents a change in line state from continuous 0s to a 1. When viewed as a bit pair (discussed further below) the binary digit value of the rising edge 54 would be a '01', with the first digit representing a first bit (i.e. the last bit of the idle state) and the second digit representing the start bit 36.

In a traditional UART, as soon as a start bit 36 is detected, a series of sample points is set for the duration of the data stream 32 transmission. These sample points are set according to the bit width parameter that is pre-defined as part of the traditional UART protocol. For example, a serial data stream 32 having a data bit 34 width set to eight would then have sampling points based off of that width, beginning with start bit 36 and extending a total of eight clocks. This bit width is commonly referred to as one bit time.

In a traditional system, the first sampling point would then be one half of one bit time after the rising edge 54. Thus, the first sampling point would be four clocks after the rising edge 54 of the start bit 36 with each subsequent sampling point offset by a full bit time (eight clocks) thereafter. In theory, this puts the sampling point of each data bit 34 within the middle of the data bit 34.

Traditional systems would then sample the serial data stream 32 at each of these pre-set sample points to make a determination whether the individually data bit 34 is a 0 or a 1. The sampling then continues at intervals of one bit time per sample until the data stream 32 stops, and the line then returns to an idle 50 state.

In a perfect system, defined as a system where the serial data stream 32 bit time matches the expected bit time parameter exactly and there is zero noise within the system, a traditional protocol should reliably detect and receive the data stream 32 and be able to accurately determine the proper binary sequence encoded therein.

In practice, however, sampling the data stream 32 using traditional protocols can actually introduce errors into the data. This is especially problematic in long data streams 32 as noise in the system coupled with variations or mismatches between the actual bit time of the data stream 32 and the expected bit time of the data stream 32 can cause misalignments, therefore resulting in drift within the system.

With traditional protocols, common sources of error include: a noise glitch that results in a false start bit 36; drift; and, a misalignment between the expected bit width and actual bit width. When a noise glitch results in a false start bit 36, traditional protocols will still set sampling points and will attempt to determine the binary sequence based on these improperly set sample points that likely do not align with the serial data stream. When the data stream is misaligned, whether through a false sample point, through drift, or through misalignment based on a difference in expected bit width and actual bit width, the entire data stream 32 may be unusable and/or unreadable when received and decoded.

Noise in the transmission, whether in the data stream 32 or in the transmission lines, can further cause errors when a sampling point aligns with a noise glitch such that the sample point indicates a 1 or a 0 in the serial data stream where the bit actually encodes for the opposite. This too can make the data unusable.

UART protocol 30 thus may utilize a pattern matching methodology instead of a traditional sampling method to determine the binary value of each data bit 34 to reduce errors and increase reliability of the protocol 30. Specifically, recognizing that the serial data stream 32 encodes a series of 0s or 1s, UART protocol 30 can evaluate the data stream 32 by comparing every two-bit pair 56 of data bits 34 throughout the entire length of the data stream 32 to known two-bit pair 56 patterns to determine the most likely value for each data bit 34.

As each bit may have a maximum of two values, i.e. a 0 or a 1, each two-bit pair 56 must fall into one of four patterns: a '01' pattern where the first bit is a 0 and the second bit is a 1, i.e., the rising edge 54 pattern; a '10' pattern wherein the first bit is a 1 and the second bit is a 0, otherwise known as a falling edge pattern; a '11' pattern where both bits are a 1, otherwise known as a constant 1; or a '00' pattern where both bits represent a 0, otherwise known as a constant 0 pattern.

It will be recognized that only two comparisons need be made to derive all four possible matches for each two-bit pair 56. Specifically, having only two possible data values at each bit gives rise to two pattern groups containing two patterns each. A first pattern group can include the rising and falling edges while a second pattern group can include the constant 0s and constant 1s. Thus, a comparison need only be made to one pattern, also referred to herein as a comparator, from each group as the other pattern within each group is recognized as the inverse of the comparison pattern. For example, if the rising edge 54 pattern of '01' is selected as the first comparator from the first group, a falling edge pattern '10' in the data stream 32 would be the inverse of the comparison. Accordingly, a 100% match to a rising edge 54 would represent a 0% match to a falling edge, and vice versa. Similarly, for the other bit pattern group, a 100% match to a constant 1 comparator would represent a 0% match to a constant 0 and vice versa. Therefore, comparisons need only be made to one comparator from each pattern group to derive each bit pair in the serial data.

With continued reference to FIG. 4, UART protocol 30 may utilize this pattern-matching methodology can operate according to the following method: First, a transceiver 29 can detect a rising edge 54 of a start bit 36 representing the beginning of a data stream 32. Once a start bit 36 is detected, the UART protocol 30 is committed to detecting the data stream 32 and decoding that same data stream 32. Decoding the data stream 32 is process of converting each of the data bits 34 to their binary digits.

Unlike a traditional protocol, the detection of a start bit 36 does not preset or predetermine all of the sampling points. Instead, data bit 34 in the data stream 32 can be measured with the pattern comparisons being done continuously in what are known as pattern matching windows 58.

As seen in FIG. 4, a pattern matching window 58 eliminates the first clock 60 and the last clock 60 from consideration for each two-bit pair 56. This is because it is inherent in serial data streams 32 that there is always a one clock uncertainty for each data bit 34. Utilizing eight samples per bit gives a pattern-matching window 58 of fourteen clocks 60 representing each two-bit pair 56. As shown in FIG. 4, open arrows represent clocks 60 outside the pattern matching window 58 while solid arrows represent clocks 60 inside the pattern matching window 58.

As with traditional protocol, the expected bit time can be used to predict the next data bit 34, however, unlike a traditional protocol, UART protocol 30 can shift the pattern-matching window 58 by two clocks 60 to continuously compare each two-bit pair 56 to the two comparator patterns. As each two-bit pair 56 is received by the transceiver 29, UART protocol 30 can continuously sample each pair 56 and can calculate the percentage match of each bit by comparing the number of samples indicating a specific binary result with the number of expected samples and comparing that to the preset threshold. According to one non-limiting example, using a pattern matching window 58 of fourteen samples, a perfect match would be the first seven samples of a first bit 34 showing the same binary digit with the second seven samples showing a same binary digit. For example, is the first seven samples indicate that the first bit 34 is a 0 and the second seven samples indicate that the second bit 34 is a 1, this represents a perfect match to the rising edge 54 pattern of '01'. If the opposite were true, i.e. the first seven showed 1 and the second seven showed 0, it would be a 0% match level to the rising edge, but would be perfect match to the inverse falling edge pattern of '10'.

According to this example, if the first seven samples were to indicate a 0 while the second seven indicate a 1, it would be only a 50% match level to a constant comparator, e.g. constant 0s or constant 1s. Thus, the 100% match level to a rising edge 54 pattern is more likely than a 50% match level to a constant pattern, thus the rising edge 54 pattern is chosen to be most likely correct.

The detection of the start bit 36 may be accomplished through matching the rising edge 54 pattern utilizing the comparator match methodology, coupled with a configurable match threshold. According to one aspect, the match threshold may be a 75% match although the configurability may allow for other thresholds to be used for the start bit 36 according to the desired implementation.

According to one aspect, only start bit 36 matches that meet or exceed the match threshold, may indicate that a start bit 36 has been detected.

According to one embodiment, a separate match threshold may be used to quantify subsequent data bits 34 within the data stream 32. According to another embodiment, subsequent data bits 34 may be identified according to the "most likely" match, wherein the data bits are assigned a binary value based on the highest match percentage between the comparators and the two-bit pair 56.

The pattern matching window 58 can be shifted to the next two-bit pair 56 and a similar comparison can be done. According to one aspect, the next two-bit pair 56 may include the second data bit 34 of the previous pair 56 thus providing a check of the previous result and further increasing accuracy of the pattern matching methodology. For example, according to this aspect, the first two-bit pair may be bits $b_1$-$b_2$, the next pair 56 being $b_2$-$b_3$, the next $b_3$-$b_4$, and so on.

According to another aspect, the next two-bit pair 56 may include the next sequential two-bits pair 56 that has not been evaluated. For example, according to this aspect, the first two-bit pair 56 may be bits $b_1$-$b_2$ while the following two-bit pair 56 may be bits $b_3$-$b_4$, and so on.

In addition to increasing the accuracy and reliability of UART protocol 30, the use of pattern matching windows to evaluate each two-bit pair 56 of data stream 32 allows comparison of the expected edge of each data bit 34 in the stream 32 to determine if the edges 62 align to the expected edge position. If the edges 62 are properly aligned, the UART protocol 30 can continue to evaluate the next two-bit pair 56. If the edges 62 are not aligned with the expected edge position, the pattern-matching window 58 may be adjusted forward or backward by one clock value at each misaligned bit edge 62 to keep the clocks 60 aligned with the actual data stream 32, thus reducing or eliminating drift. By way of one non-limiting example, if an edge 62 appears in the data stream 32 one clock 60 before it is expected to appear, the pattern matching window 58 may be adjusted backwards one clock 60 so that the next expected edge is one clock 60 earlier. Traditional protocols do not typically allow such adjustments as once the sampling points are set, they are immovable.

According to one embodiment, run length limiting (RLL) conversions may be applied to a data stream 32 to limit the number of consecutive bits having the same value. By way of one non-limiting example, an RLL conversion may be applied that limits the consecutive number of 0s or 1s to a maximum of three. The use of RLL conversions then guarantees detectable edges 62 within the data stream 32 at a maximum interval, therefore further facilitating the adjustment of pattern matching window 58 forwards or backwards to realign the clocks 60 with the data stream 32. The combination of RLL conversions with the ability to adjust the pattern matching windows 58 forwards or backwards can result in a more robust timing system which may further allow a serial data stream 32 to have an unlimited length without the risk of losing sync between the data stream 32 and clocks 60.

Once each two-bit pair 56 is evaluated and assigned a binary digit, and the data stream 32 ceases to be transmitted, the process is complete and the line may return to its idle 50 state to await reception of the next data stream 32.

According to one embodiment, UART protocol 30 may utilize a double data rate (DDR) sampling methodology where each data bit 34 is sampled twice per clock 60, specifically on each edge 62 which can double the sample rate. In turn, this can allow the UART protocol 30 to be adapted for operation on older systems with limited clock speeds. According to one aspect, UART protocol 30 can be implemented with a 400 MHz clock. According to another aspect, UART protocol 30 utilizing DDR may be implemented with a 200 MHz clock.

According to another embodiment, UART protocol 30 may further allow for an accumulation of match levels over the life of a data stream 32 transmission. According to this aspect, the match level for every two-bit pair 56 may be accumulated and stored to produce a reliability figure of merit for the detected data stream 32. By way of non-limiting example, the percentage match above the threshold match level for every two-bit pair 56, may be stored and the total average match level may be calculated by dividing the sum of all match levels by the total number of bits 34. This average match level may then be used as the reliability figure of merit, and may be expressed in terms of confidence, i.e. "this data stream 32 was detected with N % confidence" where N equals the average match level.

Figure 5:
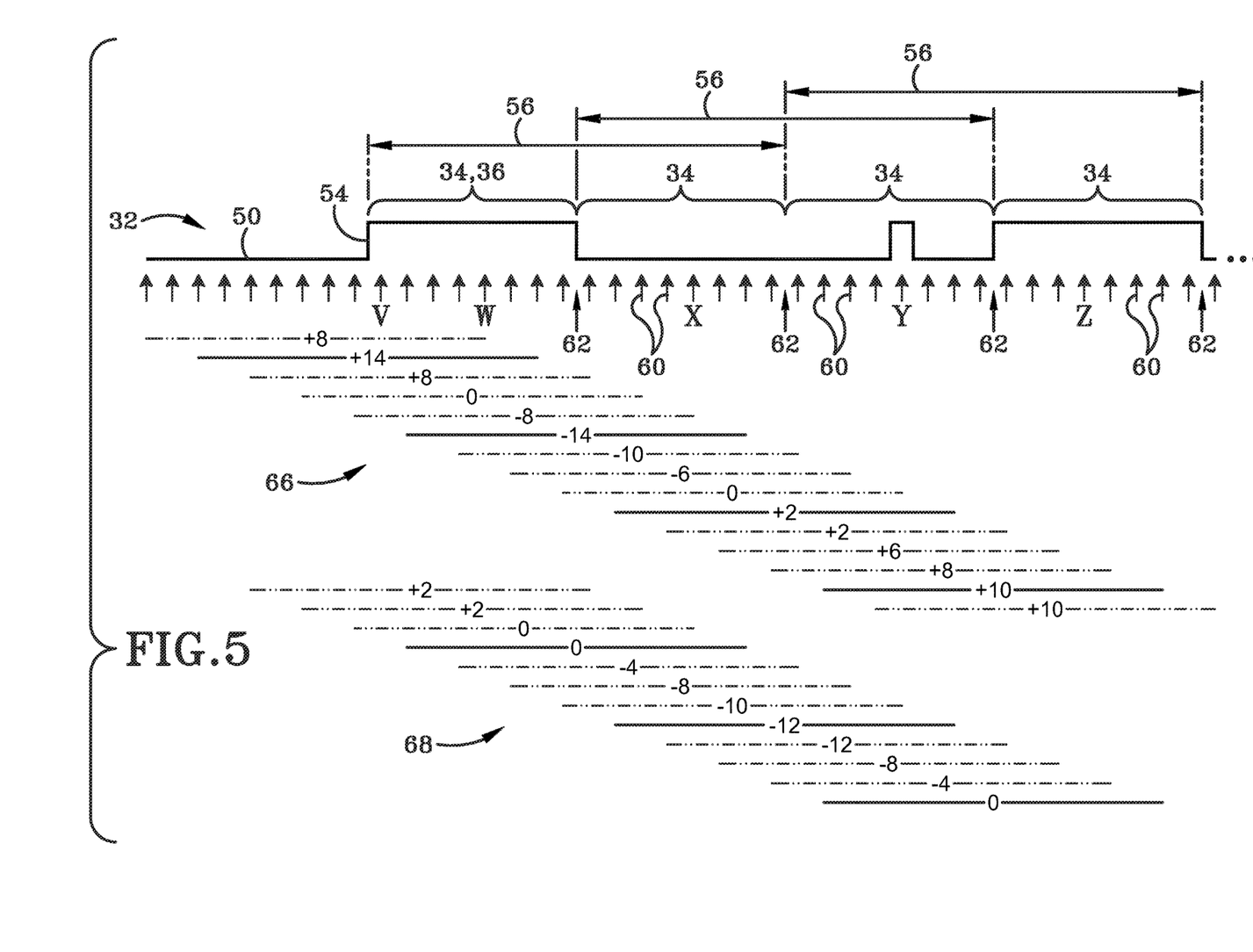
FIG. 5 is a representative comparison of a traditional protocol and the protocol of the present disclosure.

With reference to FIG. 5, an illustration of a traditional protocol compared to the UART protocol 30 is shown wherein the top line represents a serial data stream 32 where the lower levels would indicate a bit value of 0, the higher levels indicate a bit value of 1, and the vertical lines represent a change in the data stream 32 from 0 to 1 (rising edge 54) or vice versa (falling edge 64). The data stream 32 is depicted from left to right.

Each arrow beneath the data stream 32 represents a single clock 60 with the arrow marked 'V' representing the rising edge 54 a start bit 36. FIG. 5 assumes a bit width of eight, thus each data bit 34 is eight clocks 60 wide, starting at the start bit 36 (a portion of the final bit 34 is omitted, however, it is assumed to extend to the eighth clock 60). The continuous 0s to the left of the rising edge 54 represent the line in an idle 50 state.

A traditional protocol would first detect the start bit 36 at clock V, and would then set sampling points based on the expected bit width of eight. Each of these subsequent sampling points is marked as W, X, Y, and Z, respectively. The first sampling point W after the rising edge 54, is set one-half of a bit width after sampling point V, i.e. four clocks 60, with points X, Y, and Z each one bit width apart from each prior sampling point.

Then, a traditional protocol would sample, or examine, the data stream at each sampling point to determine if the bit associated therewith encodes a binary 0 or a binary 1. At sampling point W, the traditional protocol would rightfully assign a value of 1; at point X, a value of 0; and at point Z, a value of 1. At sampling point Y, however, a traditional protocol would assign a value of 1, despite the fact that seven of the eight clocks 60 lined up with that bit 34 would indicate a value of 0. The traditional protocol assigns the value of 1 due to the fact that a noise glitch aligns with the sampling point Y, thus giving a false reading. Accordingly, the four-bit data stream depicted would be assigned a binary sequence of '1011'.

Contrast this with UART protocol 30, which is depicted by the horizontal lines below the series of clocks. Each line represents a pattern matching window 58 extending a width of two bits, encompassing 14 clocks 60 (omitting the one clock uncertainty from each bit 34, as discussed previously). The upper set of lines, indicated at 66 then represents pattern matching a first comparator value and the lower set 68 of lines representing the pattern matching with a second comparator. As used in FIG. 5, the first comparator is the rising edge 54 pattern of '01' and the second comparator is the constant 1s pattern of '11'. Further, as used in FIG. 5, the minimum match threshold being used is 75%.

As the data stream 32 is evaluated by UART protocol 30, the pattern matching windows 58 can sample every two clocks 60 due to DDR sampling, which gives two samples at every clock, and can compare the detected pattern with the comparators, assigning a value to each window. As used in FIG. 5, positive numbers in the upper set 66 of pattern matching windows 58 represent matches to the rising edge 54 pattern '01' and negative numbers in the upper set 66 represent inverse matches (i.e. matches to the falling edge 64 pattern '10'). Similarly, positive numbers in the lower set 68 represent matches to the constant 1s pattern while negative numbers represent matches to the inverse constant 0s pattern.

Solid lines in pattern matching windows 58 represent pattern matching windows 58 of interest as these pattern matching windows 58 are aligned with the expected edges 62 of bits 34 in the data stream 32. Dash-dot-dot lines represent samples to the left or right of the expected edges 62 of bits 34. The distinction between the lines and the relevance thereof is discussed below.

Beginning then with the first pattern matching window 58 of interest, which is aligned with the rising edge 54 of the start bit 36, the value there shows as a (+14) match to the rising edge 54 pattern. This indicates that the samples immediately preceding the rising edge 54 start bit 36 have a value of 0 with the samples following the rising edge 54 start bit 36 have a value of 1, thus providing a 100% match to the rising edge 54 pattern of '01'. Due to the DDR sampling, the samples represent two samples per clock for each of the three clocks to the left and right of the rising edge 54 and the clock 60 aligned with the rising edge 54 itself, giving a total of seven clocks, each sampled twice, for a total of fourteen samples. No comparison is yet made with the second comparator because a data stream 32 was not present until this moment, thus only the rising edge 54 pattern associated with the start bit 36 is of interest at this point. Thus, the pattern matching methodology would correctly assign a value of 0 to the idle 50 state and a value of 1 to the start bit 36.

Now that a start bit 36 is detected, UART protocol 30 will continue the pattern matching methodology until the data stream 32 ceases after a configurable, but known, number of data bits 34. According to one aspect, the data stream 32 may contain a stop bit to indicate that the data stream 32 is complete. If such a stop bit is present, UART protocol 30 will continue to evaluate the data stream 30 using the pattern matching methodology herein until the stop bit is detected. Once detected, UART protocol 30 will cease and the line will return to its idle 50 state.

Accordingly, once the start bit 36 is detected, FIG. 5 shows the next pattern matching window 58 of interest, which is aligned with the expected edge of the start bit 36, has a match value of (−14) in the upper set 66 indicating a 0% match to the rising edge 54 pattern, but a 100% match to the inverse falling edge 64 pattern of '10'. The corresponding comparison to the second comparator in the lower set 68 shows a zero result, indicating a 50% match to either constant pattern, i.e. '00' or '11'. This pattern matching window 58 then provides that the first bit 34 of the two-bit pair 56, which is the start bit 36, has a value of 1 and the second bit has a value of 0. Comparing this to the line depiction of data stream 32 shows this is correct, with the start bit 36 having a value of 1, and the next bit 34 having a value of 0.

The third pattern matching window 58 of interest, gives a (+2) value in the upper set 66, indicating a 14% match to the first comparator, and a corresponding (−12) in the lower set 68 indicating an 85% match with the inverse of the second comparator. As the 85% match to the second comparator exceeds the 14% match to the first comparator, the two-bit pair 56 is assigned a value of '00'. The (+2) and (−12) indicates that two of the fourteen samples do not match the comparator pattern, which is due to the noise glitch, but because the match percent indicates that the two-bit pair 56 is most likely a '00', the noise glitch is properly disregarded and the values are assigned.

The final pattern matching window 58 of interest gives a (+10) match to the rising edge 54 pattern of '01' and a (−4) match to the constant 1s pattern, making it most likely to be a '01'. Again, the noise glitch is considered, but disregarded by the more likely result, which again, passes the eye-test when viewing the data stream 32 line.

UART protocol 30, then, would assign the four bit 34 data stream 32 in FIG. 5 a binary sequence of '1001', which more closely matches the actual data stream 32, thus eliminating the error caused by the noise glitch in the third bit.

Further, as shown in the example in FIG. 5, each of the pattern matching windows 58 of interest align with the actual edges of data bits 34 such that the local maximum, i.e. the highest match values, fall in the windows 58 of interest. If a higher match value were to appear in a pattern matching window 58 to the left or right of a pattern matching window 58 of interest, that would indicate that the actual edge 62 does not align with the expected edge of that particular data bit 34, thus the expected edge is either early (the local maximum comes after the pattern matching window 58 of interest) or late (the local maximum comes before the pattern matching window 58 of interest). UART protocol 30 allows the pattern matching window 58 of interest to then shift one clock forward or backwards to account for this misalignment. In longer data streams 32, each time an expected edge does not align with the actual edge 62, the pattern matching window 58 can be adjusted, thus, drift is significantly reduced and/or eliminated completely. Traditional protocols do not allow for such edge alignment adjustments and drift can become an issue over time, particularly in longer data streams 32.

In the simplified example in FIG. 5, a single noise glitch resulting in a sequence of '1011' when the sequence should be '1001' is likely correctable by the parity bit 48 and/or by hamming as the single misreported digit may be changed as it only has a single other option, i.e. a 0 instead of a 1. In longer data streams 32, a single error is likewise correctable as there is only one possible option for the incorrect value. If two errors are present, a data stream is then identified as uncorrectable. If a third error appears, the data stream is both uncorrectable and unreliable. Thus the reduction and/or the elimination of errors is critical as it only takes three errors to render a data stream useless.

Although described and illustrated herein using an 8× oversample, it will be understood that protocol 30 may be adapted for implementations using any sampling rate and/or bit rate according to the desired application. According to one aspect, the oversample rates can be a 10×, 12×, 16× or any other oversampling rate as chosen by a person of skill in the art. According to another aspect, the oversampling rate may be configurable within protocol 30.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field-Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Log ic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The indefinite articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Additionally, the method of performing the present disclosure may occur in a sequence different than those described herein. Accordingly, no sequence of the method should be read as a limitation unless explicitly stated. It is recognizable that performing some of the steps of the method in an different order could achieve a similar result.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A method comprising:
   detecting a start bit of a serial data stream having a plurality of data bits;
   comparing a pattern matching window consisting of an oversampling of a two-bit pair of data bits in the plurality of data bits to a rising edge pattern in a first comparator;
   determining a first match level between the two-bit pair of data bits in the plurality of data bits and the first comparator;
   comparing the pattern matching window consisting of the oversampling of the two-bit pair of data bits in the plurality of data bits to a constant pattern in a second comparator;
   determining a second match level between the two-bit pair of data bits in the plurality of data bits and the second comparator;
   comparing the first match level to an initial value to identify the start bit of the serial data stream;
   comparing the first match level to the second match level after detection of the start bit; and,
   assigning a binary value to one data bit of the two-bit pair of data bits in the plurality of data bits corresponding to the larger of the first and second match values only if the larger of the first and second match values meets or exceeds a match value threshold.

2. The method of claim 1 further comprising:
   comparing every two-bit pair of data bits in the plurality of data bits to the first comparator;
   determining a first match level between every two-bit pair of data bits in the plurality of data bits and the first comparator;
   comparing every two-bit pair of data bits in the plurality of data bits to the second comparator;
   determining a second match level between every two-bit pair of data bits in the plurality of data bits and the second comparator;
   comparing the first match level to the second match level; and,
   assigning a binary value to each data bit of every two-bit pair of data bits in the plurality of data bits corresponding to the larger of the first and second match values only if the larger of the first and second match values meets or exceeds a match value threshold.

3. The method of claim 2 further comprising:
   detecting a stop bit at a defined end of the serial data stream; and,
   stopping the comparisons of the two-bit pairs and assigning of binary values thereto in response to detecting the stop bit.

4. The method of claim 1 wherein the rising edge pattern in the first comparator is a two-bit binary pattern of '01' where 0 represents the first bit in the two-bit pair and 1 represents the second bit in the two-bit pair.

5. The method of claim 1 wherein the constant pattern in the second comparator is a two-bit binary pattern of '11' where the first 1 represents the first bit in the two-bit pair and the second 1 represents the second bit in the two-bit pair.

6. The method of claim 1 wherein the first match level represents a percentage match between the two-bit pair and the first comparator and the second match level represents a percentage match between the two-bit pair and the second comparator.

7. The method of claim 1 wherein the match value threshold is configurable.

8. The method of claim 7 further comprising:
   detecting the edge of each data bit in the two-bit pair;
   comparing a location of the detected edge of each data bit in the two-bit pair to an expected edge of each data bit in the two-bit pair; and,
   determining if the location of the detected edge aligns with the expected edge.

9. The method of claim 8 further comprising:
   adjusting the expected edge forward one clock if the detected edge of a data bit is later than the expected edge of a data bit or backwards one clock if the detected edge of a data bit is earlier than the expected edge of a data bit.

10. A system comprising:
    a processor capable of executing logical functions; and
    at least one non-transitory computer readable storage medium having instructions encoded thereon that, when executed by the processor, implements operations to decode a serial data stream, the instructions including:
    detect a start bit within a serial data stream having a plurality of data bits;
    compare a pattern matching window consisting of an oversampling of a two-bit pair of data bits in the plurality of data bits to a rising edge pattern in a first comparator;
    determine a first match level between the two-bit pair of data bits in the plurality of data bits and the first comparator;

compare the pattern matching window consisting of the oversampling of the two-bit pair of data bits in the plurality of data bits to an constant pattern in a second comparator;

determine a second match level between the two-bit pair of data bits in the plurality of data bits and the second comparator;

compare the first match level to an initial value to identify the start bit of the serial data stream;

compare the first match level to the second match level after detection of the start bit; and, assign a binary value to each data bit of the two-bit pair of data bits in the plurality of data bits corresponding to the larger of the first and second match values only if the larger of the first and second match values meets or exceeds a match value threshold.

11. The system of claim 10 wherein the processor is a field-programmable gate array further comprising:

at least one programmable hardware description language (HDL) encoded logic block, the at least one programmable HDL encoded logic block encoded with the instructions to implement the operations to decode the serial data stream.

12. The system of claim 11 wherein the instructions further include:

detect the edge of each data bit in the two-bit pair of data bits;

compare a location of the detected edge of each data bit in the two-bit pair of data bits to an expected edge of each data bit;

determine if the location of the detected edge aligns with the expected edge; and adjust the expected edge forward one clock if the detected edge of a data bit is later than the expected edge of a data bit or backwards one clock if the detected edge of a data bit is earlier than the expected edge of a data bit.

13. The system of claim 12 wherein the instructions further include:

detect a stop bit within the serial data stream; and, stop the comparisons of the two-bit pairs and assigning of binary values thereto in response to the detection of the stop bit.

14. The system of claim 10 wherein the processor is an application specific integrated circuit further comprising:

at least one programmable hardware description language (HDL) encoded logic block, the at least one programmable HDL encoded logic block encoded with the instructions to implement the operations to decode the serial data stream.

15. The system of claim 10 wherein the rising edge pattern in the first comparator is a two-bit binary pattern of '01' where 0 represents the first bit in the two-bit pair and 1 represents the second bit in the two-bit pair.

16. The system of claim 10 wherein the constant pattern in the second comparator is a two-bit binary pattern of '11' where the first 1 represents the first bit in the two-bit pair and the second 1 represents the second bit in the two-bit pair.

17. The system of claim 10 wherein the first match level represents a percentage match between the detected two-bit pair and the first comparator and the second match level represents a percentage match between the detected two-bit pair and the second comparator.

18. The system of claim 10 wherein the match value threshold is configurable.

* * * * *